United States Patent
Nishio

(10) Patent No.: US 8,032,144 B2
(45) Date of Patent: Oct. 4, 2011

(54) MULTI-CARRIER COMMUNICATION DEVICE AND FEEDBACK INFORMATION COMMUNICATION METHOD

(75) Inventor: Akihiko Nishio, Yokosuka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/562,935

(22) PCT Filed: Jun. 30, 2004

(86) PCT No.: PCT/JP2004/009202
§ 371 (c)(1),
(2), (4) Date: Feb. 3, 2006

(87) PCT Pub. No.: WO2005/004362
PCT Pub. Date: Jan. 13, 2005

(65) Prior Publication Data
US 2006/0153061 A1    Jul. 13, 2006

(30) Foreign Application Priority Data
Jul. 3, 2003  (JP) .................................. 2003-191293

(51) Int. Cl.
*H04W 72/00* (2009.01)
(52) U.S. Cl. ......... 455/450; 455/502; 455/522; 370/329
(58) Field of Classification Search ............... 455/69, 455/126, 452.2, 447, 450, 522, 67.11, 423, 455/502; 370/329, 318, 208, 342; 375/265, 375/285
See application file for complete search history.

(56) References Cited

U.S. PATENT DOCUMENTS

| | | | | |
|---|---|---|---|---|
| 5,463,672 A | * | 10/1995 | Kage | 455/458 |
| 5,751,763 A | * | 5/1998 | Bruckert | 375/141 |
| 5,832,387 A | * | 11/1998 | Bae et al. | 455/522 |
| 5,956,642 A | * | 9/1999 | Larsson et al. | 455/449 |
| 6,289,009 B1 | * | 9/2001 | Sato | 370/342 |
| 6,694,147 B1 | * | 2/2004 | Viswanath et al. | 455/517 |
| 6,735,256 B1 | * | 5/2004 | Toshimitsu | 375/260 |
| 6,819,930 B1 | * | 11/2004 | Laroia et al. | 455/450 |
| 6,993,294 B2 | * | 1/2006 | Nobukiyo et al. | 455/67.11 |

(Continued)

FOREIGN PATENT DOCUMENTS
JP    11027231    1/1999
(Continued)

OTHER PUBLICATIONS
PCT International Search Report dated Sep. 28, 2004.
(Continued)

*Primary Examiner* — Ping Hsieh
(74) *Attorney, Agent, or Firm* — Dickinson Wright PLLC

(57) ABSTRACT

A multicarrier communication apparatus that is capable of suppressing interference of feedback information with other channels and alleviating a reduction in an uplink capacity. In PL signal reception section (260) of this apparatus, PL signal extraction section (261) extracts pilot signals and reception quality measuring section (262) measures reception quality such as an SIR. Here, since pilot signals are included in respective subcarriers, reception quality measuring section (262) measures reception quality of subcarriers. FBSC determining section (270) determines a feedback information subcarrier based on the reception quality of subcarriers. More specifically, FBSC determining section (270) determines a subcarrier having the highest reception quality as a feedback information subcarrier. FBSC determining section (270) outputs information about the feedback information subcarrier (FBSC information) to control CH transmission section (110) and FB information reception section (250).

6 Claims, 12 Drawing Sheets

U.S. PATENT DOCUMENTS

| | | | |
|---|---|---|---|
| 7,092,373 B2 * | 8/2006 | Parantainen et al. | 370/337 |
| 7,480,261 B2 * | 1/2009 | Speight | 370/280 |
| 2001/0024427 A1 | 9/2001 | Suzuki | |
| 2001/0028677 A1 * | 10/2001 | Wang et al. | 375/148 |
| 2002/0067701 A1 * | 6/2002 | Chen et al. | 370/318 |
| 2002/0119781 A1 * | 8/2002 | Li et al. | 455/450 |
| 2002/0141367 A1 | 10/2002 | Hwang | |
| 2003/0039270 A1 | 2/2003 | Chang | |
| 2003/0073409 A1 | 4/2003 | Nobukiyo | |
| 2003/0096579 A1 | 5/2003 | Ito et al. | |
| 2003/0118057 A1 * | 6/2003 | Ushirokawa et al. | 370/522 |
| 2004/0097253 A1 | 5/2004 | Malkamaki | |
| 2004/0179493 A1 * | 9/2004 | Khan | 370/332 |
| 2004/0248579 A1 | 12/2004 | Fukui | |

FOREIGN PATENT DOCUMENTS

| | | |
|---|---|---|
| JP | 11055210 | 2/1999 |
| JP | 2001103060 | 4/2001 |
| JP | 2001238269 | 8/2001 |
| JP | 2002-369258 | 12/2002 |
| JP | 2003-152640 | 5/2003 |
| JP | 2003158500 | 5/2003 |
| JP | 2003-179974 | 6/2003 |
| WO | 02/082666 | 10/2002 |
| WO | 03/032566 | 4/2003 |

OTHER PUBLICATIONS

N. Miki, et al.: "Experimental Evaluation of Hybrid ARQ Employing Packet Combining in Forward Link for VSF-OFCDM Broadband Wireless Access," Technical Report of IEICE, RCS2003-26, May 2003, The Institute of Electronics, Information and Communication Engineers, pp. 15-22, with English Abstract.

3GPP TR 25.858 v5.0.0 (Mar. 2002), 3rd Generation Partnership Project; Technical Specification Group Radio Access Network; High Speed Downlink Packet Access; Physical Layer Aspects (Release 5), pp. 1-31.

3GPP TS 25.213 v5.4.0 (Sep. 2003), 3rd Generation Partnership Project; Technical Specification Group Radio Access Network; Spreading and modulation (FDD) (Release 5), pp. 1-28.

Japanese Office Action date Jan. 6, 2009.

Chinese Office Action date Jun. 5, 2009.

Japanese Office Action dated Jul. 19, 2011.

* cited by examiner

US 8,032,144 B2

MULTI-CARRIER COMMUNICATION DEVICE AND FEEDBACK INFORMATION COMMUNICATION METHOD

TECHNICAL FIELD

The present invention relates to a multicarrier communication apparatus and feedback information communication method.

BACKGROUND ART

In recent years, for example, multimedia data is being increasingly distributed and broadband for downlinks in particular is being studied frequently (e.g., see Non-Patent Document 1). Non-Patent Document 1 discusses downlink high-speed packet transmission adopting an OFDM (Orthogonal Frequency Division Multiplexing) scheme which is considered as a promising communication scheme to be used for a next-generation radio communication system. The OFDM scheme is one of multicarrier communication schemes and a technology for transmitting data mapped on a plurality of subcarriers and has advantages such as strong resistance to frequency selective fading.

Furthermore, as a high-speed packet transmission on a downlink, an HSDPA (High Speed Downlink Packet Access) standard is being developed by the 3GPP (3rd Generation Partnership Project). Adaptive modulation, scheduling and HARQ (Hybrid Automatic Repeat reQuest) are indispensable technologies for the HSDPA standard.

Adaptive modulation in HSDPA is a technology for a base station apparatus to transmit data to a mobile station apparatus by changing, for example, a modulation scheme and coding rate (MCS: Modulation and Coding Scheme) according to channel quality and thereby making a transmission rate variable. When the base station apparatus changes an MCS, an optimum MCS is selected based on an index of channel quality (CQI: Channel Quality Indicator) reported from the mobile station apparatus (e.g., see Non-Patent Document 2).

Furthermore, HARQ is a technology for a mobile station apparatus to send an ACK/NACK indicating whether or not data has been received from a base station apparatus normally and for the base station apparatus to control retransmission by receiving the ACK/NACK. When sending feedback information such as CQI or ACK/NACK described above, the mobile station apparatus sends the feedback information with transmit power with a predetermined offset set, for example, in a DPCCH (Dedicated Physical Control Channel) (e.g., see Non-Patent Document 3).

The feedback information includes important information which constitutes an element to control downlink transmission at a base station apparatus and needs to be received by the base station apparatus accurately. Therefore, this feedback information maybe transmitted with relatively high transmit power. As for ACK/NACK in particular, in order to improve the efficiency of data retransmission, a required BER (bit error rate) required from the base station apparatus is high and a high offset is set for a DPCCH.

Non-Patent Document 1: "Experiment Result of Packet Combination Type Hybrid ARQ in Downlink VSF-OFCDM Broadband Radio Access" Miki, Abeta, Higuchi, Atarashi, Sawabashi, pp. 15-pp. 22, TECHNICAL REPORT OF IEICE RCS2003-26, 2003-05.
Non-Patent Document 2: 3GPP TR25.858 V5.0.0 "HSDPA physical layer aspects" (2002-03).
Non-Patent Document 3: 3GPP TS25.213 V5.4.0 "Spreading and Modulation (FDD)."

DISCLOSURE OF INVENTION

Problems to be Solved by the Invention

However, the above-described conventional technologies have such a problem that feedback information such as CQI and ACK/NACK produces considerable interference with other channels on an uplink, causing a reduction of the uplink capacity. That is, since the feedback information has relatively high transmission power, it constitutes a large interference component against other channels and tightens the uplink capacity.

Furthermore, when a mobile station apparatus is located near a cell boundary, transmission of feedback information particularly increases interference with an adjacent cell. When interference with the adjacent cell is strong, the transmission efficiency in the adjacent cell decreases consequently and throughput of the overall radio communication system decreases. These problems likewise occur also to an OFDM scheme which is expected to take on the next-generation radio communication system.

It is an object of the present invention to provide a multicarrier communication apparatus and feedback information communication method capable of suppressing interference of feedback information with other channels and alleviating a reduction of a channel capacity.

Means for Solving the Problem

A multicarrier communication apparatus according to the present invention comprises a reception section that receives a multicarrier signal with data mapped on a plurality of carriers, a measuring section that measures reception quality of the plurality of carriers and a determining section that determines a carrier having the best measured reception quality as a feedback information carrier.

ADVANTAGEOUS EFFECT OF THE INVENTION

According to the present invention, it is possible to suppress interference of feedback information with other channels and alleviate a reduction of a channel capacity.

BEST MODE FOR CARRYING OUT THE INVENTION

Now, embodiments of the present invention will be described in detail with reference to the accompanying drawings below. Note that though a communication based on an OFDM (Orthogonal Frequency Division Multiplexing) scheme using a plurality of subcarriers of frequencies orthogonal to one another will be explained as an example of multicarrier communication, the present invention is applicable to any communication in which transmission is carried out with data mapped on a plurality of carriers.

Embodiment 1

Figure 1:
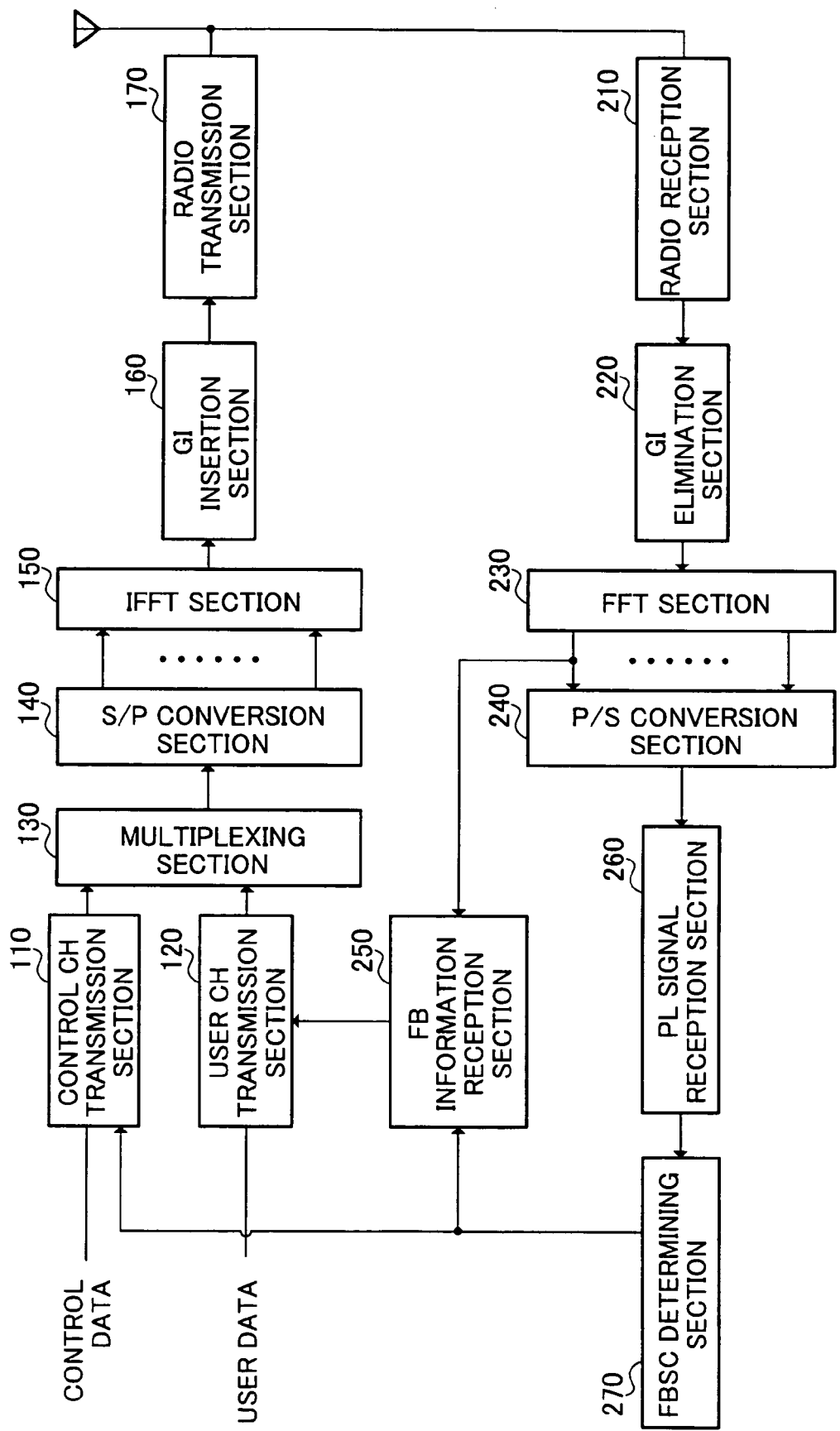
FIG. 1 is a block diagram showing the configuration of a base station apparatus according to Embodiment 1 of the present invention.

FIG. 1 is a block diagram showing the configuration of a base station apparatus according to Embodiment 1 of the present invention. The base station apparatus shown in FIG. 1 is provided with control CH (CHannel) transmission section 110, user CH transmission section 120, multiplexing section 130, S/P (Serial/Parallel) conversion section 140, IFFT (Inverse Fast Fourier Transform) section 150, GI (Guard Interval) insertion section 160, radio transmission section 170, radio reception section 210, GI elimination section 220, FFT (Fast Fourier Transform) section 230, P/S (Parallel/Serial) conversion section 240, FB (FeedBack) information reception section 250, PL (PiLot) signal reception section 260 and FBSC (FeedBack Sub-Career: subcarrier for feedback information) determining section 270.

Figure 2:
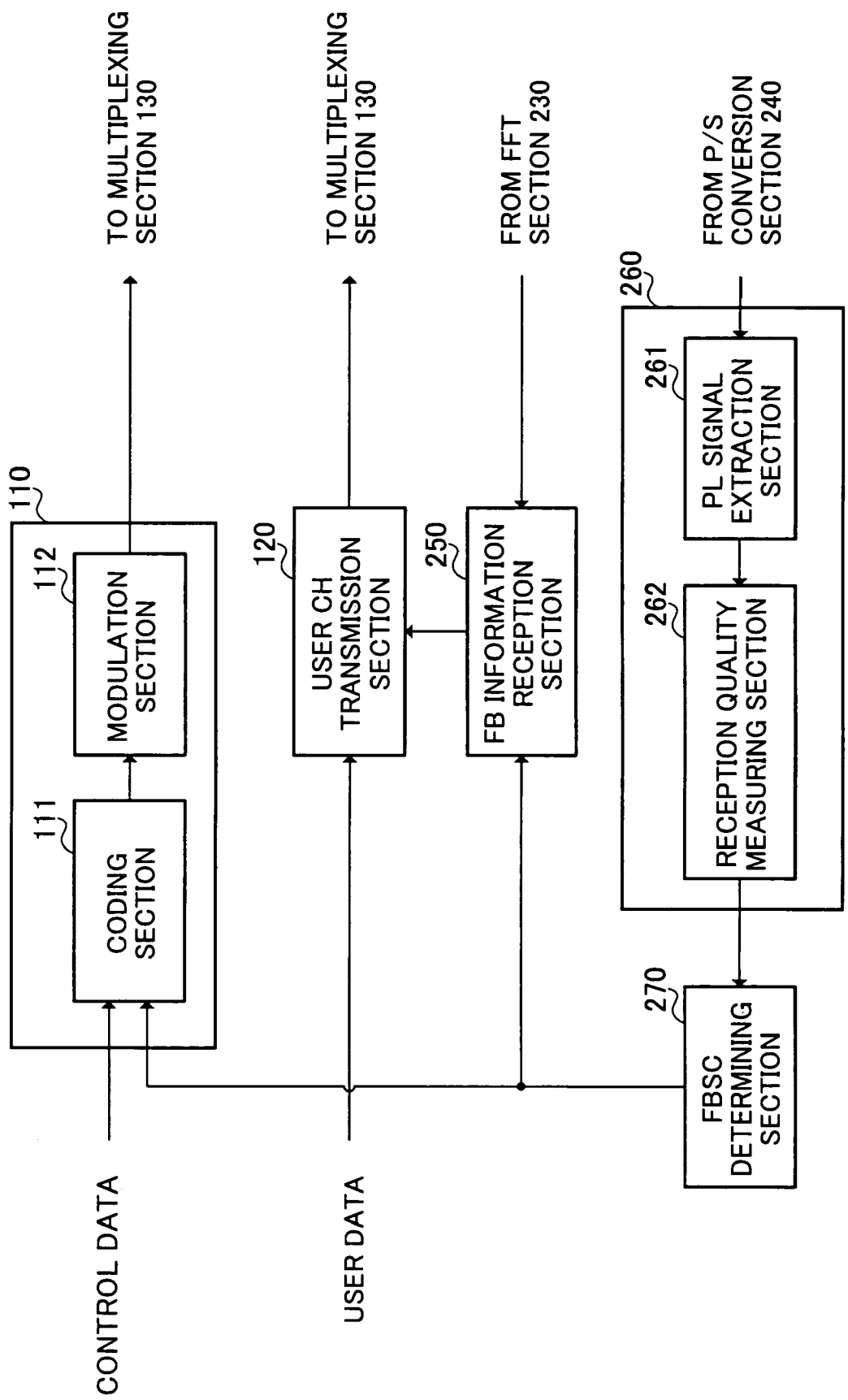
FIG. 2 is a block diagram showing the detailed configuration of the base station apparatus according to Embodiment 1.

Control CH transmission section 110 carries out coding and modulation on control data such as assignment information indicating a destination of user data and information about feedback information subcarrier (hereinafter referred to as "FBSC information") output from FBSC determining section 270 which will be described later. More specifically, as shown in FIG. 2, control CH transmission section 110 carries out coding control data and FBSC information by coding section 111 and modulation by modulation section 112 and outputs them to multiplexing section 130.

User CH transmission section 120 carries out adaptive modulation according to downlink channel quality on user data such as high-speed packet data and controls retransmission.

Figure 3:
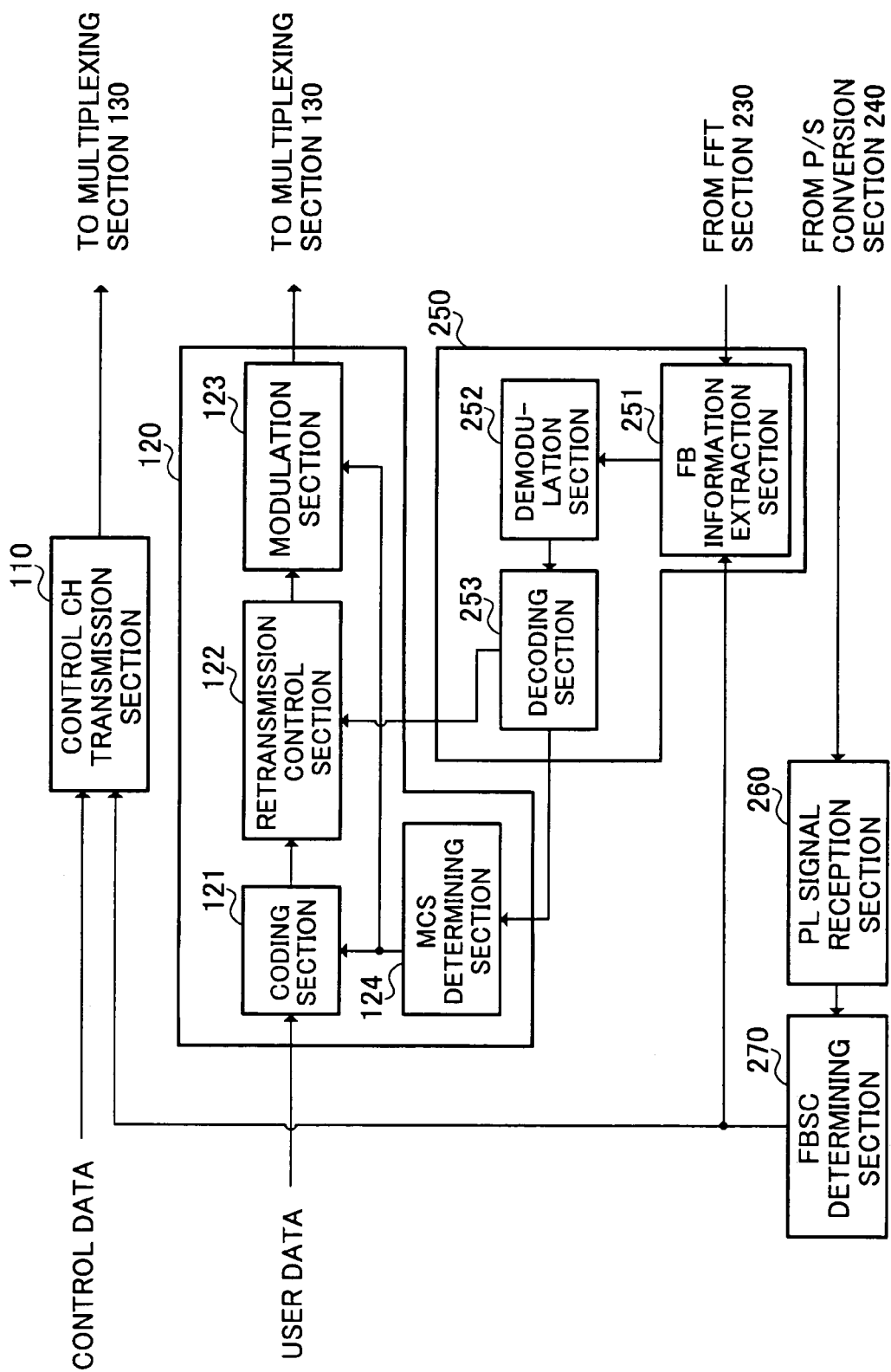
FIG. 3 is block diagram showing another detailed configuration of the base station apparatus according to Embodiment 1.

More specifically, as shown in FIG. 3, user CH transmission section 120 determines an MCS (Modulation and Coding Scheme) by MCS determining section 124 based on a CQI (Channel Quality Indicator) output from decoding section 253 which will be described later, carries out coding and modulation at a coding rate and under a modulation scheme corresponding to the determined MCS by coding section 121 and modulation section 123 respectively. Furthermore, user CH transmission section 120 temporarily stores user data previously transmitted by retransmission control section 122 and retransmits the stored user data when a NACK is output from decoding section 253, which will be described later.

Multiplexing section 130 multiplexes control data and user data and outputs the obtained multiplexed data to S/P conversion section 140.

S/P conversion section 140 S/P-converts the multiplexed data and outputs the same number of pieces of parallel data as subcarriers to IFFT section 150.

IFFT section 150 carries out an inverse fast Fourier transform on the parallel data, maps data on subcarriers of frequencies orthogonal to one another and outputs the obtained OFDM data to GI insertion section 160.

GI insertion section 160 inserts a guard interval by copying an end portion of the OFDM data to a start portion of this OFDM data.

Radio transmission section 170 carries out predetermined radio transmission processing (D/A conversion, up-conversion or the like) on the OFDM data after the insertion of the guard interval and transmits the OFDM data to a mobile station apparatus through an antenna.

Radio reception section 210 receives a signal from the mobile station apparatus through the antenna and carries out predetermined radio reception processing (down-conversion, A/D conversion or the like).

GI elimination section 220 eliminates a guard interval inserted in the received signal.

FFT section 230 carries out a fast Fourier transform on the received signal after the elimination of the guard interval and outputs obtained data of subcarriers to P/S conversion section 240. Furthermore, FFT section 230 outputs data of the feedback information subcarrier out of the data of subcarriers to FB information reception section 250.

P/S conversion section 240 P/S-converts the data of subcarriers and outputs serial data to PL signal reception section 260.

FB information reception section 250 decodes feedback information fed back using a subcarrier determined by FBSC determining section 270 which will be described later and outputs a CQI and ACK/NACK necessary for transmission of user data to user CH transmission section 120. More specifically, as shown in FIG. 3, FB information extraction section 251 of FB information reception section 250 extracts the data of the subcarrier determined as the feedback information subcarrier by FBSC determining section 270, which will be described later, out of the data of subcarriers. Furthermore, demodulation section 252 demodulates the feedback information, and decoding section 253 decodes the feedback information, outputs a CQI included in the feedback information to MCS determining section 124 and outputs an ACK/NACK to retransmission control section 122.

PL signal reception section 260 extracts known pilot signals included in the received signal, measures reception quality and outputs it to FBSC determining section 270. More specifically, PL signal extraction section 261 of PL signal reception section 260 extracts pilot signals and reception quality measuring section 262 measures reception quality such as an SIR (Signal to Interference Ratio). Here, a pilot signal is included in subcarriers, and therefore reception quality measuring section 262 measures reception quality of subcarriers.

FBSC determining section 270 determines a feedback information subcarrier based on reception quality of subcarriers. More specifically, FBSC determining section 270 determines a subcarrier having the highest reception quality as a feedback information subcarrier. FBSC determining section 270 then outputs information about the feedback information subcarrier (FBSC information) to control CH transmission section 110 and FB information reception section 250. A subcarrier number of the feedback information subcarrier, for example, is used as the FBSC information.

Figure 4:
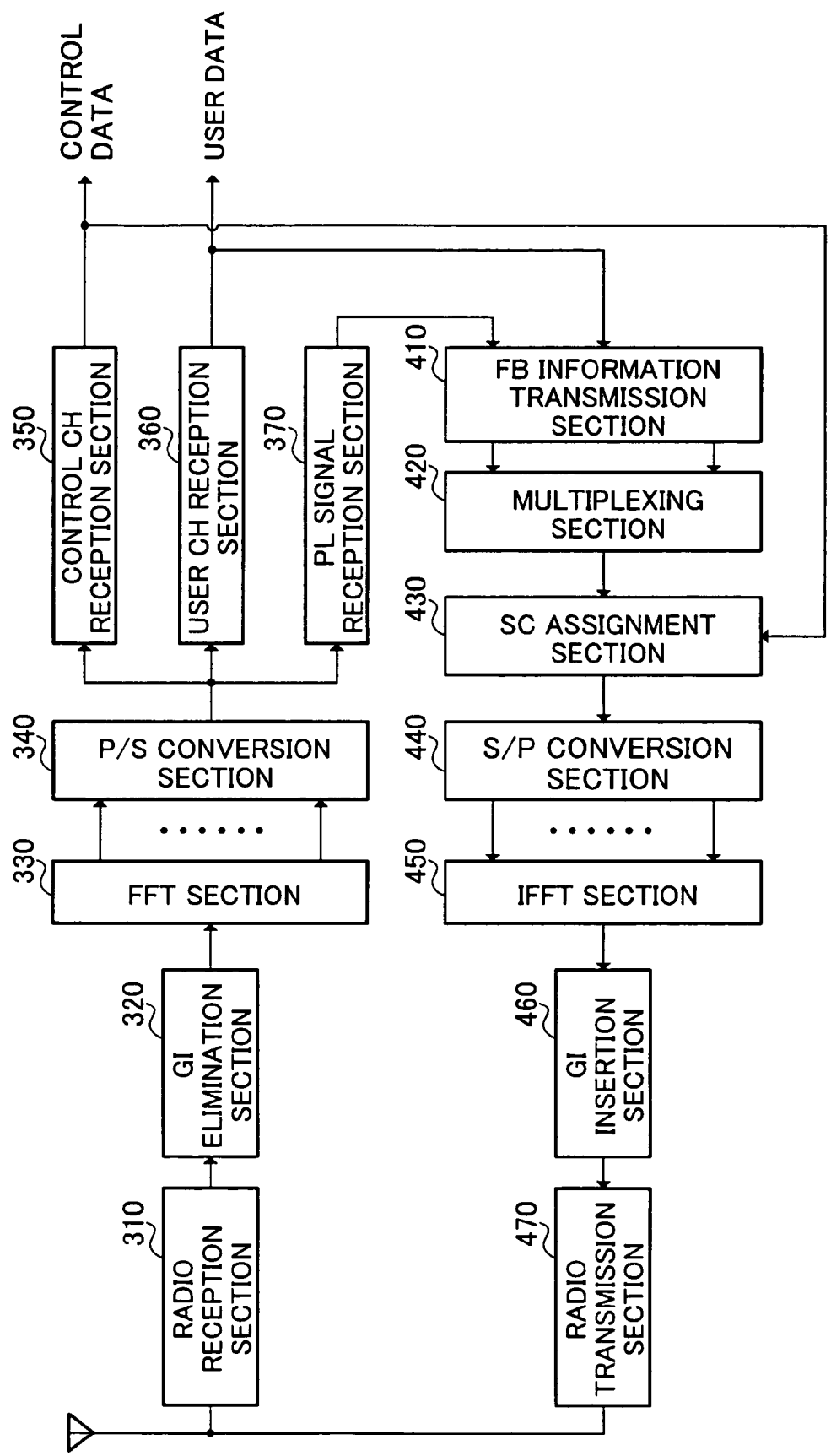
FIG. 4 is a block diagram showing the configuration of a mobile station apparatus according to Embodiment 1.

FIG. 4 is a block diagram showing the configuration of a mobile station apparatus according to this embodiment. The mobile station apparatus shown in FIG. 4 is provided with radio reception section 310, GI elimination section 320, FFT section 330, P/S conversion section 340, control CH reception section 350, user CH reception section 360, PL signal reception section 370, FB information transmission section 410, multiplexing section 420, SC (Sub-Career) assignment section 430, S/P conversion section 440, IFFT section 450, GI insertion section 460 and radio transmission section 470.

Radio reception section 310 receives a signal from the base station apparatus through an antenna and carries out predetermined radio reception processing (down-conversion, A/D conversion or the like).

GI elimination section 320 eliminates a guard interval inserted in the received signal.

FFT section 330 carries out a fast Fourier transform on the received signal after the elimination of the guard interval and outputs the obtained data of subcarriers to P/S conversion section 340.

P/S conversion section 340 P/S-converts the data of subcarriers and outputs serial data to control CH reception section 350, user CH reception section 360 and PL signal reception section 370.

Figure 5:
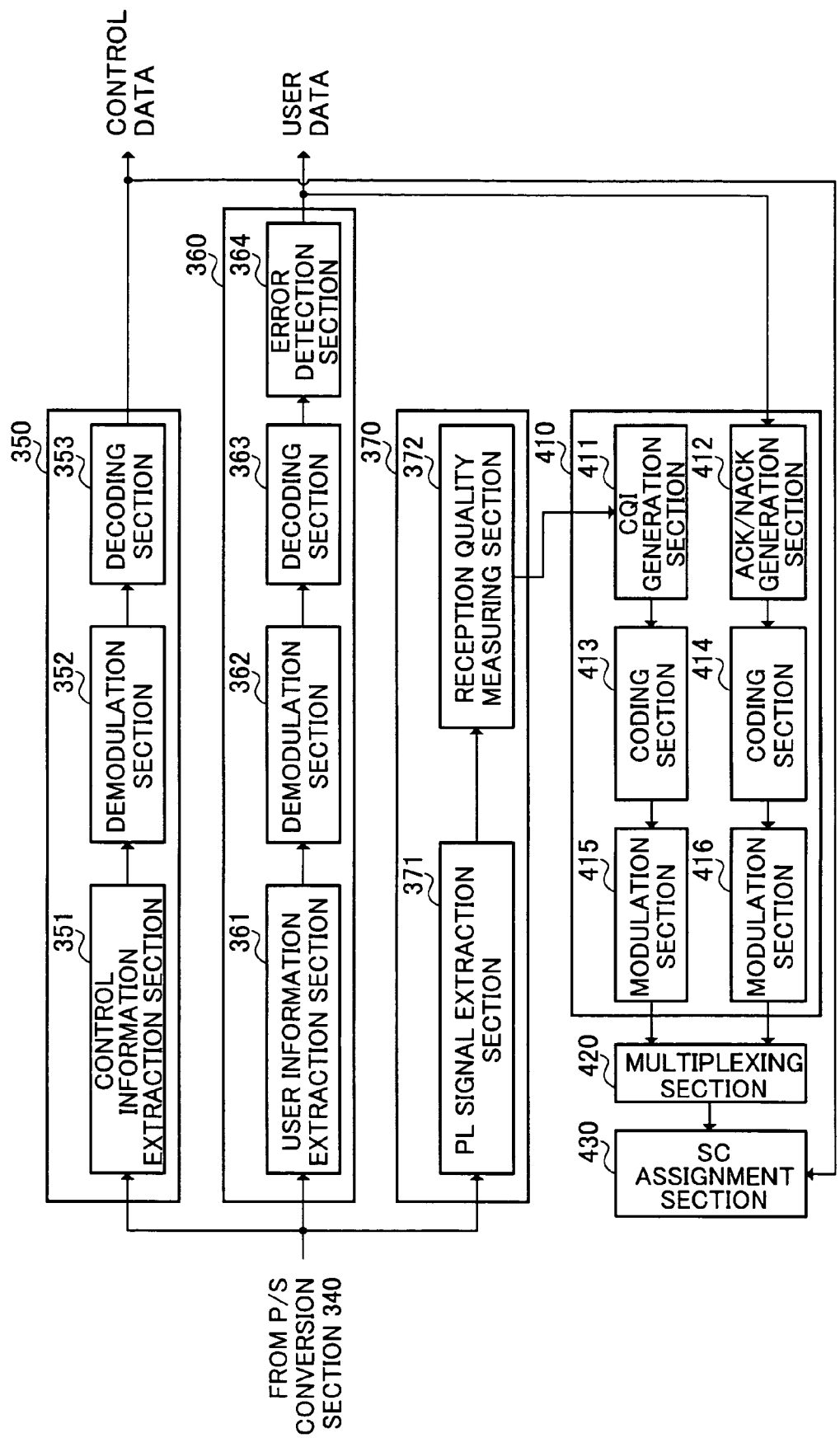
FIG. 5 is a block diagram showing the detailed configuration of the mobile station apparatus according to Embodiment 1.

Control CH reception section 350 demodulates and decodes control data and FBSC information included in the serial data output from P/S conversion section 340. More specifically, as shown in FIG. 5, control CH reception section 350 extracts control information such as control data and FBSC information by control information extraction section 351, demodulates and decodes the extracted control information by demodulation section 352 and decoding section 353 respectively, outputs control data and outputs FBSC information to SC assignment section 430.

User CH reception section 360 demodulates and decodes user data included in serial data output from P/S conversion section 340. More specifically, as shown in FIG. 5, user CH reception section 360 extracts user information such as user data by user information extraction section 361, demodulates and decodes the extracted user information by demodulation section 362 and decoding section 363 respectively and performs error detection of user data by error detection section 364 using error detection by means of, for example, CRC (Cyclic Redundancy Check) codes or the like.

PL signal reception section 370 measures reception quality of known pilot signals included in the serial data output from P/S conversion section 340. More specifically, as shown in FIG. 5, PL signal reception section 370 extracts pilot signals by PL signal extraction section 371, measures reception quality such as an SIR by reception quality measuring section 372 and outputs the measurement result to CQI generation section 411 which will be described later.

FB information transmission section 410 transmits feedback information such as CQI and ACK/NACK. More specifically, FB information transmission section 410 generates a CQI according to the reception quality measurement result of pilot signals by CQI generation section 411, performs coding and modulation by coding section 413 and modulation section 415 respectively and outputs the pilot signals to multiplexing section 420. Furthermore, FB information transmission section 410 generates an ACK or NACK according to the error detection result of user data by ACK/NACK generation section 412, performs coding and modulation by coding section 414 and modulation section 416 respectively and outputs the ACK or NACK to multiplexing section 420.

Multiplexing section 420 multiplexes the CQI and ACK/NACK with other transmission data (not shown) and outputs the obtained multiplexed data to SC assignment section 430.

SC assignment section 430 assigns a subcarrier specified by the FBSC information to the multiplexed data including the feedback information.

S/P conversion section 440 carries out S/P conversion so that the multiplexed data including the feedback information is mapped on the subcarrier assigned by SC assignment section 430 and outputs the same number of pieces of parallel data as subcarriers to IFFT section 450.

IFFT section 450 carries out an inverse fast Fourier transform on the parallel data, maps data on subcarriers of frequencies orthogonal to one another and outputs the OFDM data obtained to GI insertion section 460.

GI insertion section 460 inserts a guard interval by copying an end portion of the OFDM data to a start portion of this OFDM data.

Radio transmission section 470 carries out predetermined radio transmission processing (D/A conversion, up-conversion or the like) on the OFDM data after the insertion of the guard interval and transmits the OFDM data to the base station apparatus.

Next, the operations of the base station apparatus and mobile station apparatus configured as shown above will be explained.

First, the operation after a feedback information subcarrier is determined by the base station apparatus until FBSC information is transmitted will be explained.

Figure 6:
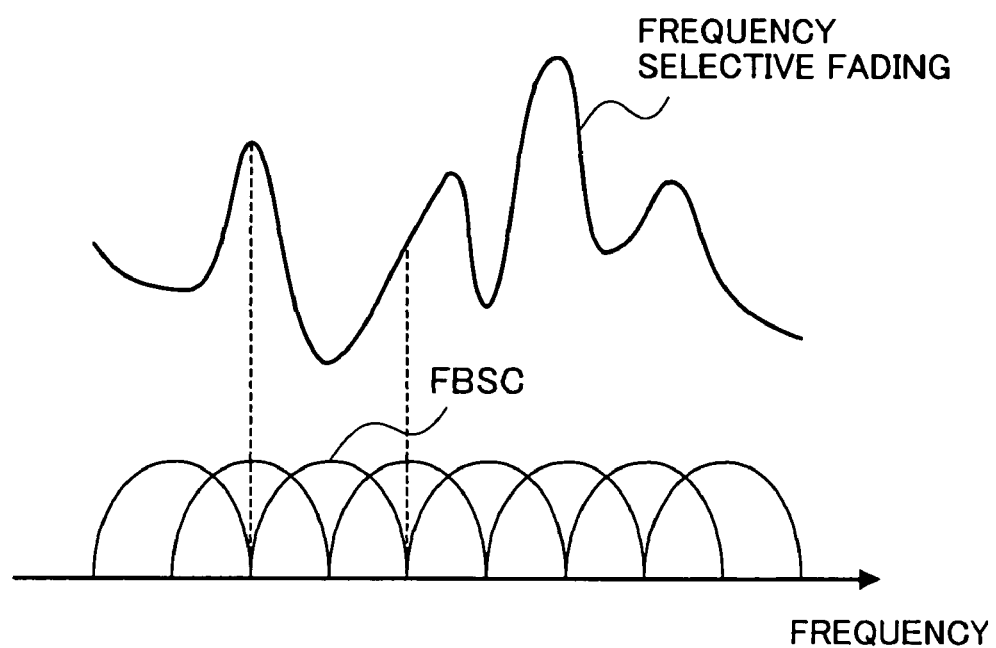
FIG. 6 illustrates the operation of the base station apparatus according to Embodiment 1.

A signal received by the base station apparatus includes a known pilot signal for subcarriers, pilot signals are extracted by PL signal extraction section 261 and reception quality is measured by reception quality measuring section 262. Then, FBSC determining section 270 determines a subcarrier including a pilot signal of the highest reception quality as a feedback information subcarrier. Thus determined feedback information subcarrier (FBSC) is a subcarrier having an optimum propagation state of frequency selective fading as shown in FIG. 6 or subcarrier having the small amount of interference from other cells and a frequency band of good reception quality. Therefore, when the mobile station apparatus transmits feedback information using the feedback information subcarrier, it is possible to satisfy required quality of feedback information generally having strict requirements with relatively low transmit power.

Then, the feedback information subcarrier number or the like is output to coding section 111 in control CH transmission section 110 and FB information extraction section 251 in FB information reception section 250 as FBSC information.

Since the FBSC information is output to FB information extraction section 251, the subcarrier on which the next feedback information to be reported from the mobile station apparatus is mapped is already-known to the base station apparatus. Therefore, FB information extraction section 251 is capable of easily selecting the subcarrier on which the feedback information is mapped and extracting the feedback information.

On the other hand, the FBSC information output to coding section 111 is coded together with control data, modulated by modulation section 112 and output to multiplexing section 130.

Furthermore, the user data is coded by coding section 121 and temporarily stored by retransmission control section 122. When an ACK is output from decoding section 253 in FB information reception section 250, this user data is output to modulation section 123 and when a NACK is output from decoding section 253, the previously transmitted user data is output to modulation section 123. That is, when the previously transmitted user data is correctly received by the mobile station apparatus, new user data is output and when the previously transmitted user data is not correctly received (that is, lost in the propagation path or the error detection result is very bad), the previously transmitted user data is output.

Furthermore, the user data is modulated by modulation section 123 and output to multiplexing section 130. Coding by coding section 121 and modulation by modulation section 123 are performed at a coding rate and under a modulation scheme corresponding to the MCS determined by MCS determining section 124.

The FBSC information, control data and user data are multiplexed by multiplexing section 130, S/P-converted by S/P conversion section 140, subjected to an inverse fast Fourier transform by IFFT section 150 and thereby transformed into OFDM data. A guard interval is inserted into the OFDM data by GI insertion section 160, subjected to predetermined radio transmission processing by radio transmission section 170 and transmitted to the mobile station apparatus via the antenna.

Next, the operation after a signal is received by the mobile station apparatus until feedback information is sent will be explained.

The signal sent from the base station apparatus is received by radio reception section 310 via the antenna of the mobile station apparatus and subjected to predetermined radio reception processing. The guard interval of the received signal is removed by GI elimination section 320, the received signal is subjected to a fast Fourier transform by FFT section 330 and P/S-converted by P/S conversion section 340 into serial data.

Control information including FBSC information and control data are extracted by control information extraction section 351 in control CH reception section 350 from the serial data and demodulated and decoded by demodulation section 352 and decoding section 353 respectively. The FBSC information of the decoding result is output to SC assignment section 430.

Furthermore, user information including user data is extracted from the serial data by user information extraction section 361 in user CH reception section 360, demodulated and decoded by demodulation section 362 and decoding section 363 respectively and subjected to error detection by error detection section 364 using, for example, CRC. The error detection result is output to ACK/NACK generation section 412 in FB information transmission section 410.

Furthermore, known pilot signals included in the serial data are extracted by PL signal extraction section 371 in PL signal reception section 370 and reception quality such as SIR is measured by reception quality measuring section 372. The measurement result is output to CQI generation section 411 in FB information transmission section 410.

A CQI is generated by CQI generation section 411 according to the measurement result of reception quality, coded and modulated by coding section 413 and modulation section 415 respectively and output to multiplexing section 420.

Furthermore, when the error detection result is good, an ACK is generated by ACK/NACK generation section 412, and on the contrary when the error detection result is bad, a NACK is generated and an ACK and a NACK are coded and modulated by coding section 414 and modulation section 416 respectively and output to multiplexing section 420.

Feedback information including these CQI and ACK/NACK is multiplexed with other transmission data (not shown) by multiplexing section 420 and assigned a subcarrier by SC assignment section 430. The subcarrier assigned to the feedback information by SC assignment section 430 is the subcarrier specified by the FBSC information sent from the base station apparatus. In other words, the subcarrier assigned to the feedback information is the subcarrier having an optimum propagation state.

The multiplexed data including feedback information is then S/P-converted by S/P conversion section 440, and at this time the feedback information is S/P-converted so as to be mapped on the subcarrier assigned by SC assignment section 430 and the same number of pieces of parallel data as subcarriers are output to IFFT section 450. The output parallel data is subjected to an inverse fast Fourier transform by IFFT section 450, transformed into OFDM data, inserted a guard interval by GI insertion section 460, subjected to predetermined radio transmission processing by radio transmission section 470 and transmitted to the base station apparatus via the antenna.

Here, when the feedback information is transmitted, it is general that transmit power control is performed so as to satisfy required quality. Since the feedback information is such important information that directly influences the throughput of the overall radio communication system, its required quality is normally high and transmit power thereof also needs to be increased. However, in this embodiment, since the feedback information is mapped on a subcarrier having an optimum propagation state specified by the base station apparatus, the transmit power of this subcarrier needs not be so high. Therefore, it is possible to suppress interference of the feedback information about other channels and other cells.

Finally, the operation of receiving the feedback information by the base station apparatus will be explained.

A signal sent from the mobile station apparatus is received by radio reception section 210 through the antenna of the base station apparatus and subjected to predetermined radio reception processing. The guard interval of the received signal is removed by GI elimination section 220 and the received signal is subjected to a fast Fourier transform by FFT section 230 and data of subcarriers is output.

Of these subcarriers, the subcarrier on which the feedback information is mapped by FB information extraction section, 251 in FB information reception section 250 is selected, and the feedback information is extracted and demodulated and decoded by demodulation section 252 and decoding section 253 respectively. At this time, as described above, FB information extraction section 251 stores FBSC information about the feedback information subcarrier determined by FBSC determining section 270 and therefore, can easily select the feedback information subcarrier.

The result of decoding by decoding section 253 includes CQI and ACK/NACK which are the feedback information. The CQI of them is output to MCS determining section 124 in user CH transmission section 120 and an optimum MCS in accordance with reception quality is selected by MCS determining section 124. On the other hand, the ACK/NACK is output to retransmission control section 122 in user CH transmission section 120 and any one of user data which was transmitted previously and new user data is output by retransmission control section 122 and the retransmission is controlled.

Furthermore, data of subcarriers output from FFT section 230 is P/S-converted by P/S conversion section 240, the obtained serial data is output to PL signal extraction section 261 in PL signal reception section 260. Then, a known pilot signal included in subcarriers is extracted by PL signal extraction section 261 and reception quality of the pilot signal of subcarriers is measured by reception quality measuring section 262.

Hereinafter, the above described operations are repeated and a feedback information subcarrier is determined again and this feedback information subcarrier is used and feedback information is sent from the mobile station apparatus.

The above-described explanations have been given on an assumption that the base station apparatus transmits FBSC information, control data and user data simultaneously, but these are not need to be transmitted simultaneously.

The amount of control data is generally small, and on the contrary the amount of user data is large, and therefore it may take more time to carry out demodulation and decoding of user data than demodulation and decoding of control data. Furthermore, feedback information such as CQI and ACK/NACK is generated based on a result of decoding of user data.

Despite such a situation, when FBSC information, control data and user data are transmitted simultaneously, the propagation state at the time when the feedback information subcarrier is determined differs greatly from the propagation state at the time when the actual feedback information is transmitted and the feedback information subcarrier may no longer be a subcarrier for an optimum propagation path. For this reason, when the feedback information is actually transmitted, necessary transmit power may be increased.

Figure 7:
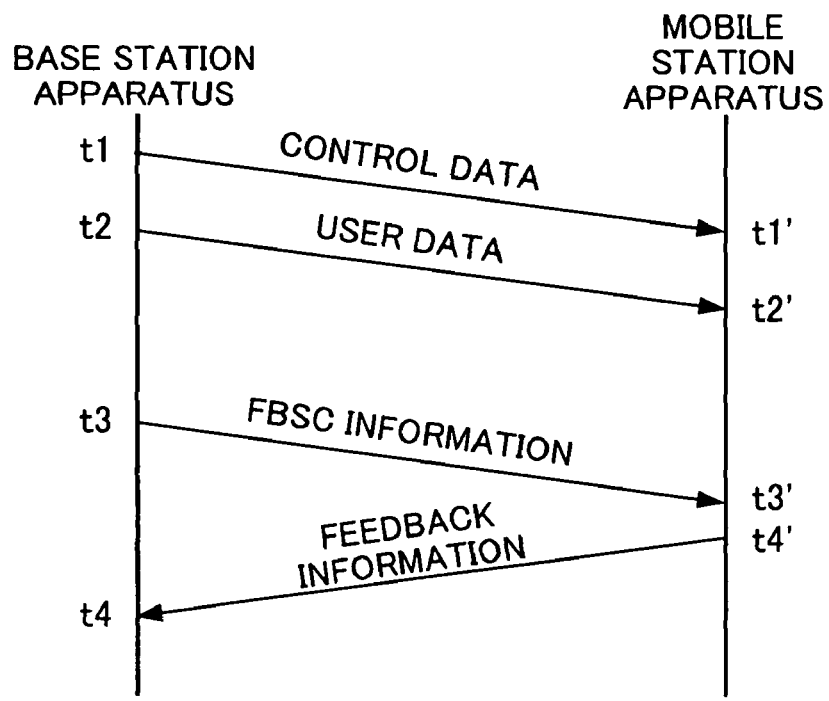
FIG. 7 is a sequence diagram illustrating other operations of the base station apparatus according to Embodiment 1.

Therefore, for example, as shown in FIG. 7, it is possible to transmit control data and user data at timings t1 and t2 on one hand and transmit FBSC information at timing t3 on the other. The mobile station apparatus takes time (t4–t2) from demodulation and decoding of user data to transmission of feedback information, while no more than time (t4–t3) for demodulation and decoding of the FBSC information, and the therefore, feedback information subcarrier can be used to transmit the feedback information. Furthermore, by delaying the timing at which the base station apparatus transmits FBSC information (furthermore, timing at which the feedback information subcarrier is determined) to the maximum extent possible, it is possible to select a subcarrier which reflects the latest propagation state.

Thus, according to this embodiment, the base station apparatus determines a subcarrier having the highest reception quality as a feedback information subcarrier, transmits FBSC information about the subcarrier to the mobile station apparatus. And the mobile station apparatus transmits feedback information such as CQI and ACK/NACK mapped on the feedback information subcarrier. Therefore, this embodiment can suppress an increase in transmit power of feedback information having high required quality, suppress interference of the feedback information with other channels and other cells and alleviate a reduction in the channel capacity.

Embodiment 2

Embodiment 2 of the present invention is characterized in that a base station apparatus which transmits user data to a plurality of mobile station apparatuses, preferentially assigns a subcarrier in a good propagation state to a mobile station apparatus having the large amount of user data to be transmitted from the base station apparatus and uses the subcarrier as a feedback information subcarrier.

Figure 8:
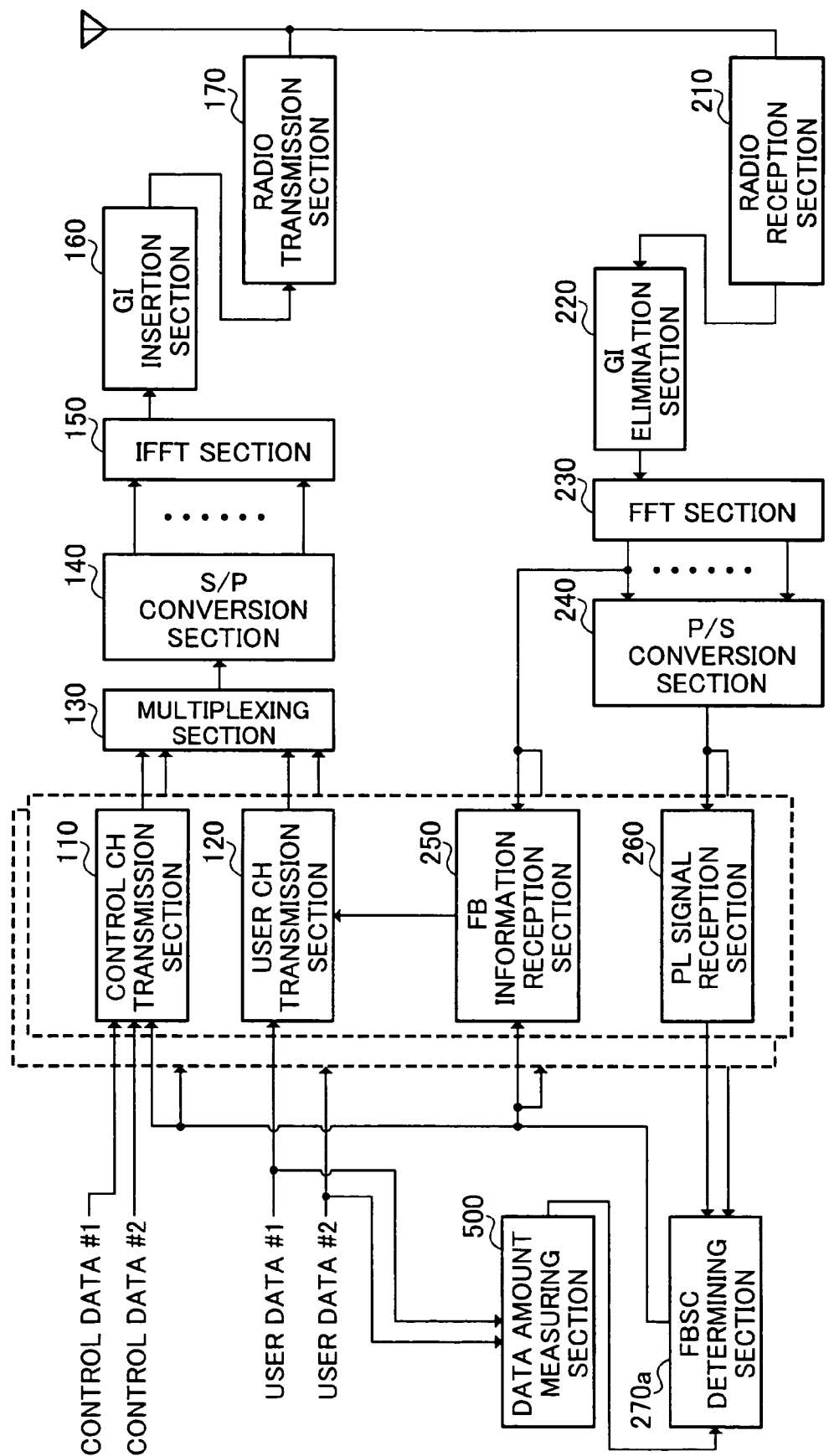
FIG. 8 is a block diagram showing the configuration of a base station apparatus according to Embodiment 2 of the present invention.

FIG. 8 is a block diagram showing the configuration of the base station apparatus according to Embodiment 2. In FIG. 8, the same parts as those in FIG. 1 are assigned the same reference numerals and explanations thereof will be omitted. The base station apparatus shown in FIG. 8 is provided with control CH transmission section 110, user CH transmission section 120, multiplexing section 130, S/P conversion section 140, IFFT section 150, GI insertion section 160, radio transmission section 170, radio reception section 210, GI elimination section 220, FFT section 230, P/S conversion section 240, FB information reception section 250, PL signal reception section 260, FBSC determining section 270a and data amount measuring section 500. In this embodiment, in order to transmit control data and user data to a plurality of mobile station apparatuses, the base station apparatus includes the same number of control CH transmission sections 110, user CH transmission sections 120, FB information reception sections 250 and PL signal reception sections 260 as users (here 2 users). The internal configurations of these processing sections are the same as those in Embodiment 1 (FIG. 2 and FIG. 3), and therefore explanations thereof will be omitted.

FBSC determining section 270a determines a feedback information subcarrier based on reception quality of subcarriers and the amount of user data directed to each user. More specifically, the feedback information subcarrier is preferentially assigned to a mobile station apparatus having the largest amount of user data to be transmitted from the base station apparatus. That is, FBSC determining section 270a basically assigns a subcarrier having the highest reception quality to each mobile station apparatus, but when the reception quality of the same subcarrier is highest for a plurality of mobile station apparatuses, this subcarrier is used as the feedback information subcarrier for the mobile station apparatus having the largest amount of data. In this case, the other mobile station apparatuses are assigned subcarriers of the next highest reception quality for the respective mobile station apparatuses.

FBSC determining section 270a outputs the information (FBSC information) about the feedback information subcarriers assigned to the respective mobile station apparatuses to control CH transmission sections 110 and FB information reception sections 250 corresponding to their respective mobile station apparatuses. As the FBSC information, for example, the subcarrier numbers of the feedback information subcarriers are used.

Data amount measuring section 500 measures the amount of user data to be transmitted from the base station apparatus to mobile station apparatuses. In this embodiment, user data is transmitted to two mobile station apparatuses, and therefore, data amount measuring section 500 measures the amounts of data such as user data #1 and user data #2. Furthermore, data amount measuring section 500 ranks the mobile station apparatuses in descending order of the amount of user data to be transmitted from the base station apparatus and reports the ranking result to FBSC determining section 270a.

Since the configuration of the mobile station apparatus according to this embodiment is similar to that of Embodiment 1 (FIG. 4 and FIG. 5), explanations thereof will be omitted.

Figure 9:
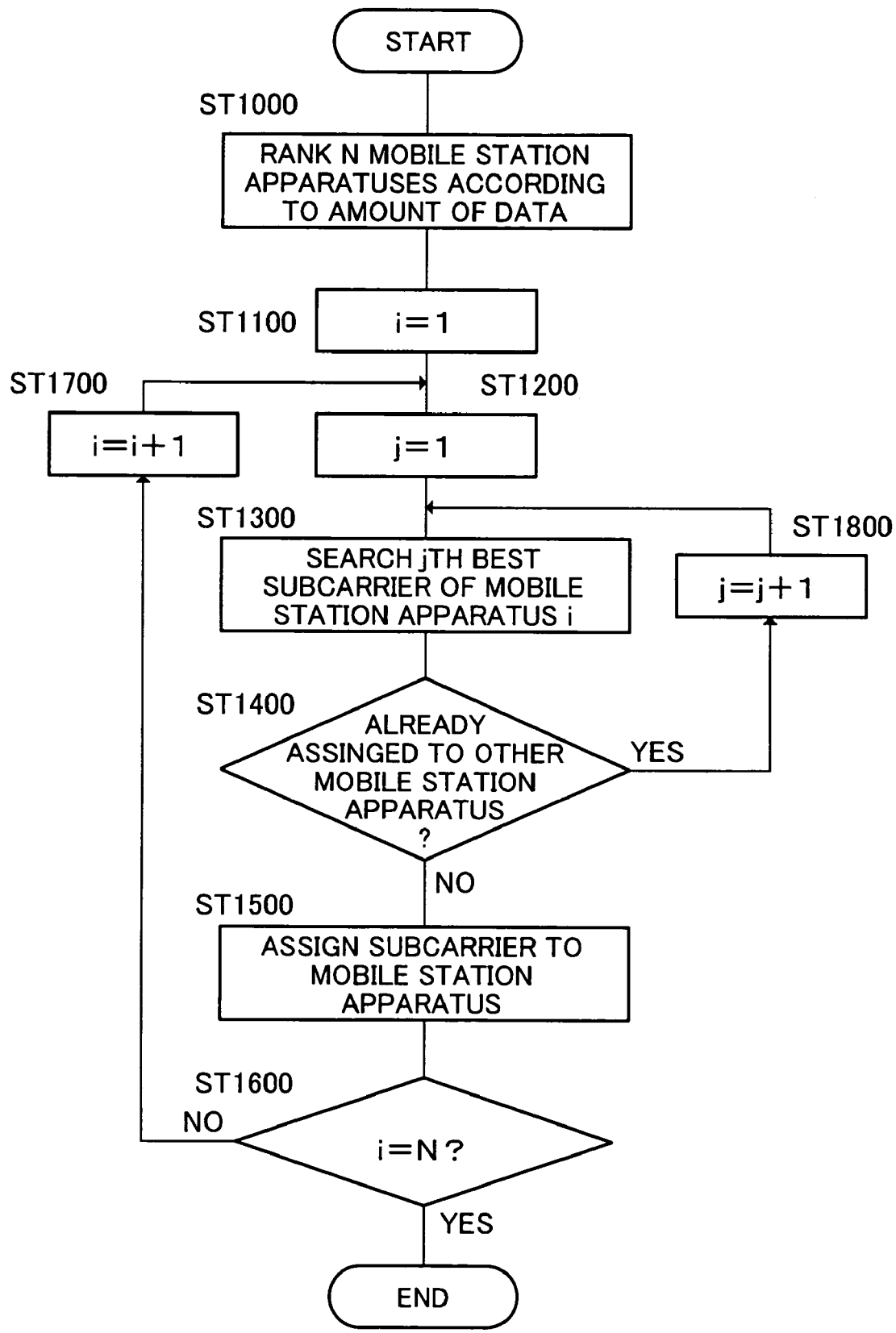
FIG. 9 is a flow chart showing the operation of the base station apparatus according to Embodiment 2.

Next, the operation of assigning feedback information subcarriers by the base station apparatus configured as shown above will be explained with reference to the flow chart shown in FIG. 9. Note that the following explanations assume that the base station apparatus shown in FIG. 8 transmits user data to N mobile station apparatuses.

First, data amount measuring section 500 measures the amount of user data to be transmitted from the base station apparatus to N mobile station apparatuses and ranks the user data in descending order of the amount of data (ST1000). As a result of the ranking, the mobile station apparatus having the maximum amount of data is designated as mobile station apparatus 1. On the contrary, the mobile station apparatus having the minimum amount of data is designated as mobile station apparatus N.

This ranking result is reported to FBSC determining section 270a. The operation of determining a feedback information subcarrier by FBSC determining section 270a will be explained below.

First, parameter i and parameter j are initialized to 1 (ST1100, ST1200). Then, the subcarrier in an optimum propagation state (the best subcarrier) to be used by mobile station apparatus 1 is searched based on reception quality of subcarriers output from PL signal reception section 260 corresponding to mobile station apparatus 1 (ST1300).

Then, it is decided whether or not the best subcarrier searched has already been assigned to other mobile station apparatuses (ST1400), but since no subcarriers have been assigned to the mobile station apparatus yet here, mobile station apparatus 1 is assigned this subcarrier in an optimum propagation state as the feedback information subcarrier (ST1500).

When the feedback information subcarrier of mobile station apparatus 1 is determined, parameter i is compared with parameter N, and it is thereby decided whether or not feedback information subcarriers have been determined for all the N mobile station apparatuses (ST1600).

When the feedback information subcarriers for all the mobile station apparatuses have not been determined yet, parameter i is incremented by 1 (ST1700) and assignment of a subcarrier to mobile station apparatus 2 is started.

That is to say, the subcarrier in an optimum propagation state (the best subcarrier) to be used by mobile station apparatus 2 is searched based on reception quality of subcarriers output from PL signal reception section 260 corresponding to mobile station apparatus 2 (ST1300)

Then, it is decided whether or not the best subcarrier searched has already been assigned to any other mobile station apparatus (here, mobile station apparatus 1) (ST1400) and if the best subcarrier has already been assigned to mobile station apparatus 1, parameter j is incremented by 1 (ST1800).

Then, the second best subcarrier is searched based on reception quality of subcarriers used by mobile station apparatus 2 (ST1300) and it is decided whether or not the second best subcarrier has already been assigned to any other mobile station apparatus (mobile station apparatus 1) (ST1400).

In this way, by deciding on mobile station apparatuses in descending order of propagation states of subcarriers as to whether or not the subcarriers have already been assigned as feedback information subcarriers to other mobile station apparatuses, the subcarrier in an optimum propagation state out of the subcarriers which have not been assigned to any other mobile station apparatus is designated as the feedback information subcarrier. Furthermore, prior to the determination of the feedback information subcarrier, data amount measuring section 500 ranks mobile station apparatuses in accordance with the amount of data and determines the above described feedback information subcarrier according to the ranking.

Therefore, mobile station apparatuses having the large amount of user data to be transmitted from the base station apparatus are preferentially allowed to use subcarriers in good propagation states as their feedback information subcarriers. The mobile station apparatuses having the large amount of user data to be transmitted from the base station apparatus necessarily often transmit feedback information such as ACK/NACK, and by giving priority to use of feedback information subcarriers in good propagation states, it is possible to improve the uplink capacity of the overall radio communication system. Furthermore, since the feedback information of mobile station apparatuses having the large amount of data and amount of retransmission is less likely to produce errors, it is possible to minimize packet errors due to feedback information errors or a reduction in the downlink throughput due to retransmission.

Thus, in this embodiment, mobile station apparatuses are ranked in descending order of the amount of user data to be transmitted from the base station apparatus and higher-ranking mobile station apparatuses are preferentially assigned subcarriers in good propagation states to be designated as feedback information subcarriers, and therefore, it is possible to suppress an increase in transmit power of feedback information of mobile station apparatuses which frequently transmit feedback information, further increase the effect of suppressing interference with other channels and other cells and improve the throughput of the overall radio communication system.

Embodiment 3

Embodiment 3 of the present invention is characterized in that a base station apparatus assigns transmit power necessary for transmission of feedback information to a mobile station apparatus.

Figure 10:
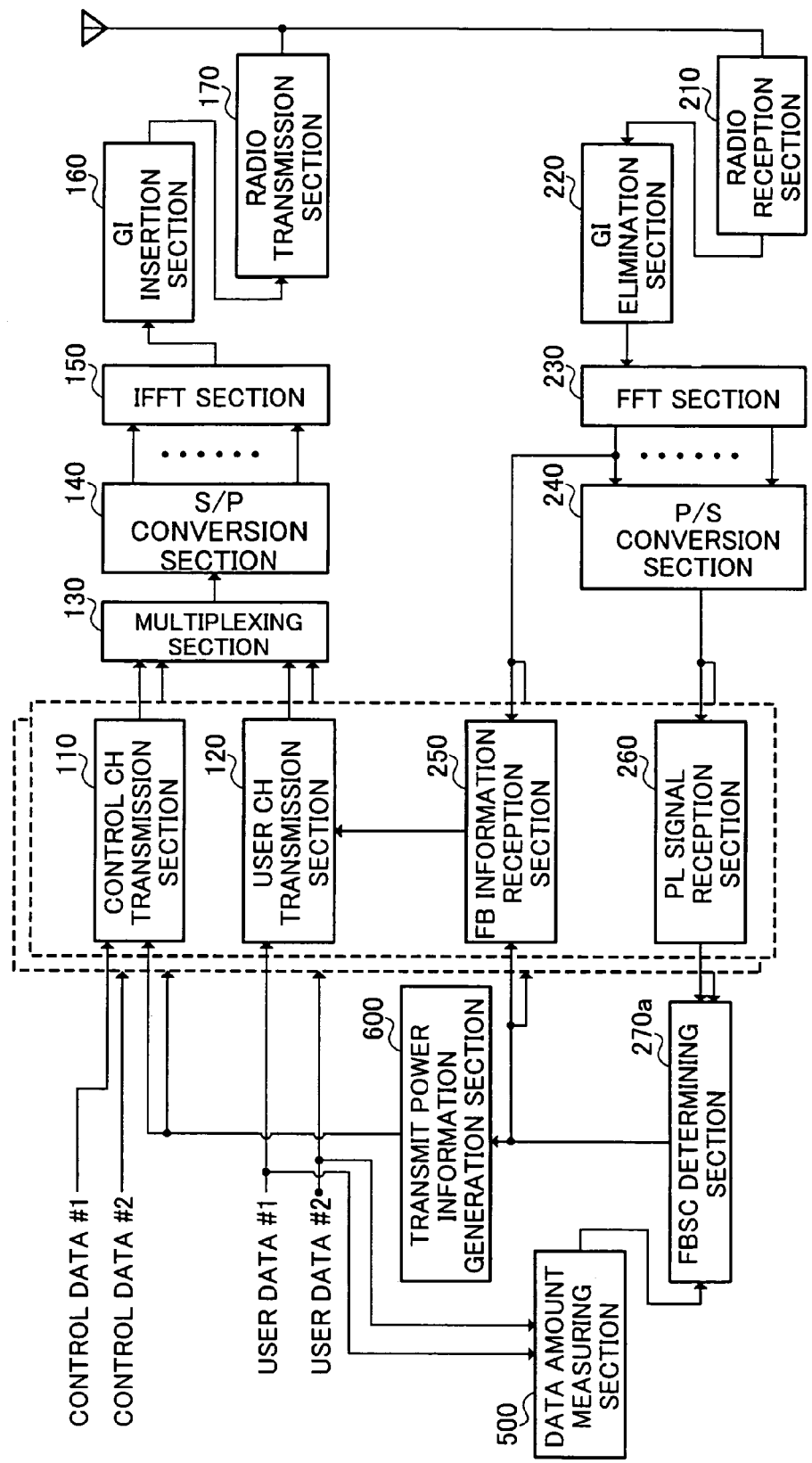
FIG. 10 is a block diagram showing the configuration of a base station apparatus according to Embodiment 3 of the present invention.

FIG. 10 is a block diagram showing the configuration of a base station apparatus according to Embodiment 3. In the same figure, the same parts as those in FIG. 1 and FIG. 8 are assigned the same reference numerals and explanations thereof will be omitted. The base station apparatus shown in FIG. 10 is provided with control CH transmission section 110, user CH transmission section 120, multiplexing section 130, S/P conversion section 140, IFFT section 150, GI insertion section 160, radio transmission section 170, radio reception section 210, GI elimination section 220, FFT section 230, P/S conversion section 240, FB information reception section 250, PL signal reception section 260, FBSC determining section 270a, data amount measuring section 500 and transmit power information generation section 600. That is, the base station apparatus according to this embodiment corresponds to the base station apparatus according to Embodiment 2 with transmit power information generation section 600 added.

Transmit power information generation section 600 generates transmit power information of feedback information based on required quality of predetermined feedback information and reception quality of a feedback information subcarrier determined by FBSC determining section 270a. More specifically, transmit power information generation section 600 calculates a difference between reception quality of the feedback information subcarrier determined by FBSC determining section 270a and required quality of feedback information and generates transmit power information to report such required transmit power that causes this difference to become 0 to the mobile station apparatus.

Figure 11:
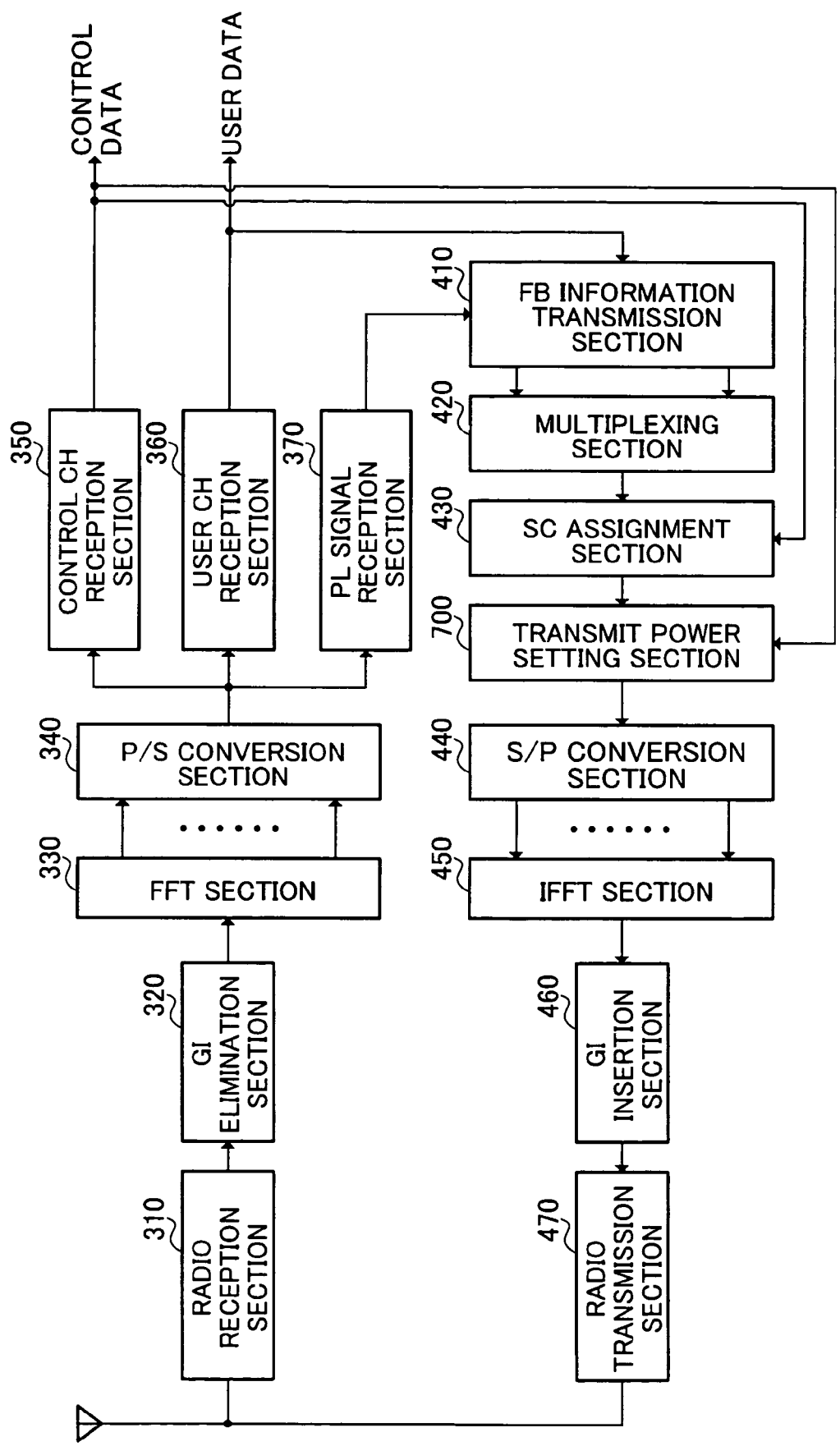
FIG. 11 is a block diagram showing the configuration of a mobile station apparatus according to Embodiment 3.

FIG. 11 is a block diagram showing the configuration of a mobile station apparatus according to Embodiment 3. In the same figure, the same parts as those in FIG. 4 are assigned the same reference numerals and explanations thereof will be omitted. The mobile station apparatus shown in FIG. 11 is provided with radio reception section 310, GI elimination section 320, FFT section 330, P/S conversion section 340, control CH reception section 350, user CH reception section 360, PL signal reception section 370, FB information transmission section 410, multiplexing section 420, SC assignment section 430, S/P conversion section 440, IFFT section 450, GI insertion section 460, radio transmission section 470 and transmit power setting section 700. That is to say, the mobile station apparatus according to this embodiment corresponds to the mobile station apparatus according to Embodiment 1 with the transmit power setting section 700 added.

Transmit power setting section 700 sets transmit power of a feedback information subcarrier assigned to feedback information by SC assignment section 430 according to the transmit power information sent from the base station apparatus.

Next, the operations of the base station apparatus and mobile station apparatus configured as shown above will be explained.

First, as in the case of Embodiment 2, the base station apparatus determines a feedback information subcarrier to be used by each mobile station apparatus. Furthermore, transmit power information generation section 600 calculates required transmit power of each feedback information subcarrier and generates transmit power information.

Required transmit power is calculated as follows. That is to say, when a feedback information subcarrier is determined by FBSC determining section 270a according to reception quality for subcarriers, the reception quality of the feedback information subcarrier is output to transmit power information generation section 600. Then, transmit power information generation section 600 calculates a difference between the required quality of feedback information and the reception quality of the feedback information subcarrier and calculates such transmit power of the feedback information subcarrier that causes this difference to become 0 as the required transmit power. However, the required transmit power calculated here is relative power with respect to uplink pilot power.

Transmit power information for reporting the calculated required transmit power to the mobile station apparatus is generated and sent to the mobile station apparatus together with FBSC information as in the case of Embodiment 1.

The mobile station apparatus carries out reception processing in the same way as Embodiment 1, FBSC information is input to SC assignment section 430 and transmit power information is input to transmit power setting section 700. SC assignment section 430 assigns the subcarrier specified by the FBSC information to feedback information including CQI and ACK/NACK or the like and transmit power setting section 700 sets the transmit power of the subcarrier assigned to the feedback information to the transmit power specified by the transmit power information. As in the case of Embodiment 1, the feedback information is transmitted to the base station apparatus.

The base station apparatus carries out reception processing of the feedback information, and adaptive modulation and retransmission control based on the feedback information as in the case of Embodiment 1. At this time, since the feedback information has been transmitted with transmit power in accordance with the transmit power information transmitted from the base station apparatus, the reception quality of the feedback information satisfies the required quality and it is possible to perform accurate adaptive modulation and retransmission control.

Thus, according to this embodiment, the base station apparatus calculates required transmit power of feedback information, transmits it to the mobile station apparatus together with FBSC information, the mobile station apparatus selects a feedback information subcarrier according to the FBSC information, sets the transmit power of the feedback information subcarrier to the required transmit power calculated by the base station apparatus, and therefore it is possible to set the transmit power of the feedback information properly, suppress interference of the feedback information with other channels and other cells and carry out adaptive modulation and retransmission control using the feedback information accurately.

Embodiment 4

Embodiment 4 of the present invention is characterized in that when a TDD scheme using the same frequency band for uplink and downlink is adopted, a mobile station apparatus determines a feedback information subcarrier and spreads this subcarrier using a spreading code for the feedback information subcarrier.

Figure 12:
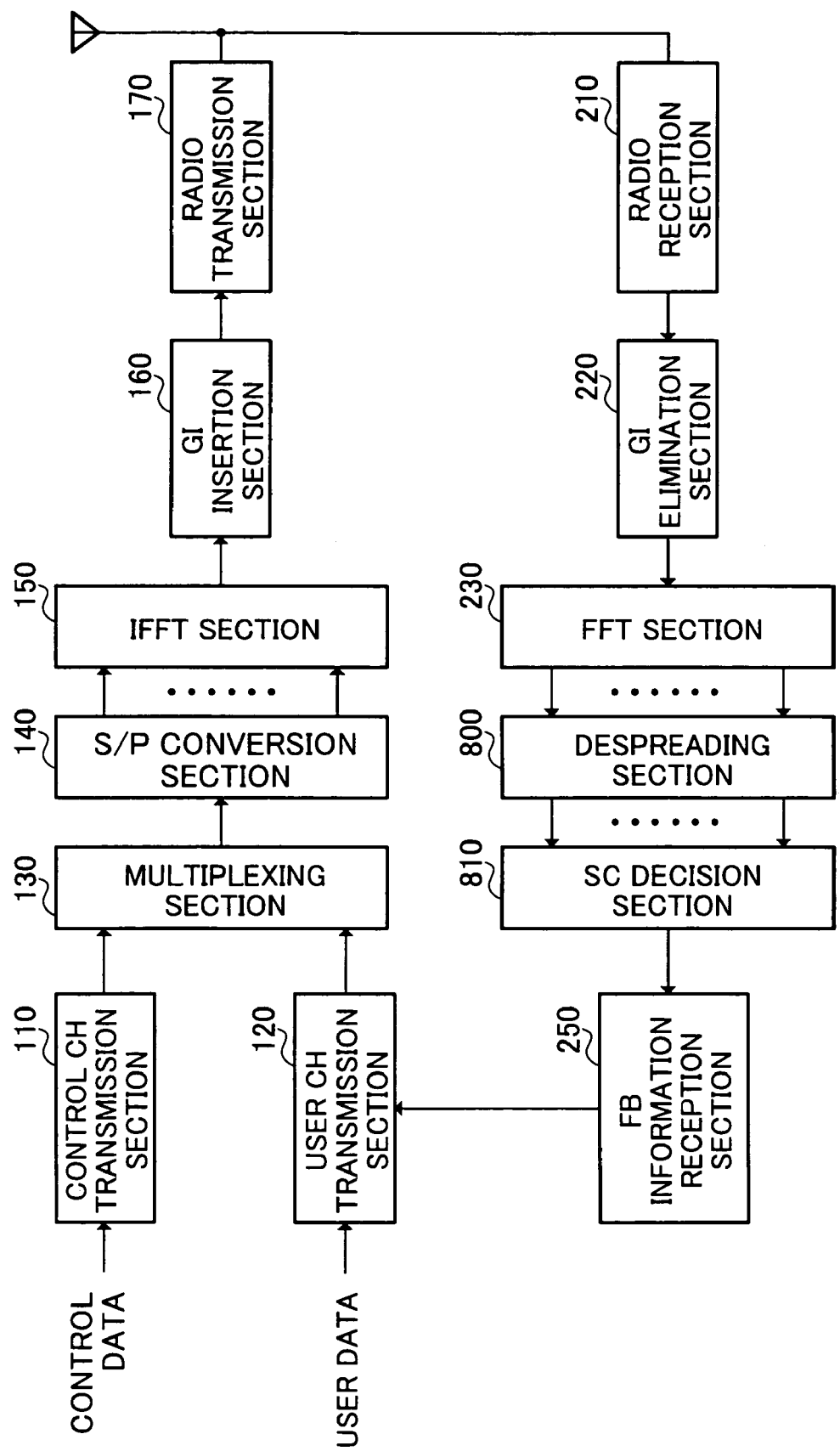
FIG. 12 is a block diagram showing the configuration of a base station apparatus according to Embodiment 4 of the present invention.

FIG. 12 is a block diagram showing the configuration of a base station apparatus according to Embodiment 4. In the same figure, the same parts as those in FIG. 1 are assigned the same reference numerals and explanations thereof will be omitted. The base station apparatus shown in FIG. 12 is provided with control CH transmission section 110, user CH transmission section 120, multiplexing section 130, S/P conversion section 140, IFFT section 150, GI insertion section 160, radio transmission section 170, radio reception section 210, GI elimination section 220, FFT section 230, FB information reception section 250, despreading section 800 and SC decision section 810. That is, the base station apparatus according to this embodiment corresponds to the base station apparatus according to Embodiment 1 with P/S conversion section 240, PL signal reception section 260 and FBSC determining section 270 removed, and despreading section 800 and SC decision section 810 added.

Despreading section 800 despreads subcarriers using a spreading code for feedback information used to spread a feedback information subcarrier.

SC decision section 810 outputs a subcarrier having the highest correlation value as a result of the despreading by despreading section 800 to FB information reception section 250 as a feedback information subcarrier.

In this embodiment, the mobile station apparatus selects the feedback information subcarrier and transmits feedback information, and therefore the base station apparatus is not capable of deciding on which subcarrier the feedback information is mapped. However, if the feedback information subcarrier is spread using a spreading code for the feedback information, it is possible to detect the feedback information subcarrier by carrying out despreading using the same spreading code.

Figure 13:
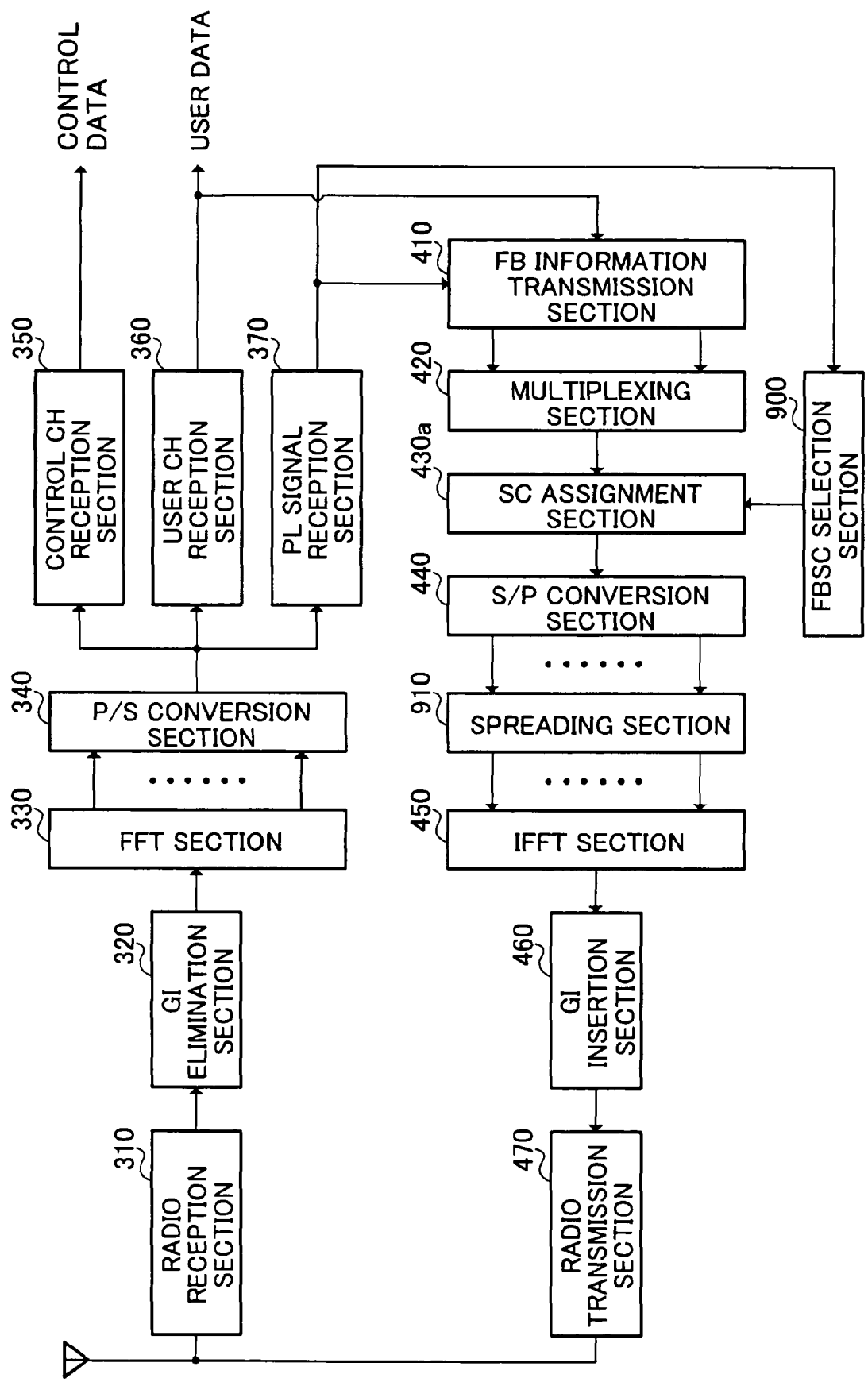
FIG. 13 is a block diagram showing the configuration of a mobile station apparatus according to Embodiment 4.

FIG. 13 is a block diagram showing the configuration of a mobile station apparatus according to Embodiment 4. In the same figure, the same parts as those in FIG. 4 are assigned the same reference numerals and explanations thereof will be omitted. The mobile station apparatus shown in FIG. 13 is provided with radio reception section 310, GI elimination section 320, FFT section 330, P/S conversion section 340, control CH reception section 350, user CH reception section 360, PL signal reception section 370, FB information transmission section 410, multiplexing section 420, SC assignment section 430a, S/P conversion section 440, IFFT section 450, GI insertion section 460, radio transmission section 470, FBSC selection section 900 and spreading section 910. That is, the mobile station apparatus according to this embodiment corresponds to the mobile station apparatus according to Embodiment 1 with SC assignment section 430 replaced by SC assignment section 430a, and FBSC selection section 900 and spreading section 910 added.

SC assignment section 430a assigns a feedback information subcarrier selected by FBSC selection section 900 to multiplexed data including feedback information.

FBSC selection section 900 determines a subcarrier having the highest reception quality as a feedback information subcarrier based on a result of reception quality measurement of a pilot signal of subcarriers. FBSC selection section 900 selects a feedback information subcarrier for the uplink based on the reception quality of pilot signals transmitted on the downlink, but since this embodiment presupposes a TDD scheme, the same frequency band is used for the uplink and downlink and the same frequency is used for downlink subcarriers and uplink subcarriers. In other words, a fading variation on the downlink is equal to a fading variation on the uplink, and therefore FBSC selection section 900 selects a subcarrier in an optimum propagation state as the feedback information subcarrier.

Spreading section 910 spreads data of subcarriers. At this time, spreading section 910 spreads the feedback information subcarrier using a feedback information spreading code.

Next, the operations of the base station apparatus and mobile station apparatus configured as shown above will be explained.

First, the operation after control data and user data are transmitted from the base station apparatus until they are received by the mobile station apparatus will be explained.

The control data and user data are coded and modulated by control CH transmission section 110 and user CH transmission section 120 respectively. The control data and user data are then multiplexed by multiplexing section 130, S/P-converted by S/P conversion section 140 and subjected to an inverse fast Fourier transform by IFFT section 150 and thereby transformed into OFDM data. A guard interval is inserted into the OFDM data by GI insertion section 160, the signal is then subjected to predetermined radio transmission processing by radio transmission section 170 and transmitted to the mobile station apparatus via the antenna. These operations are the same as those in Embodiment 1.

The signal transmitted from the base station apparatus is received by radio reception section 310 via the antenna of the mobile station apparatus and subjected to predetermined radio reception processing. The guard interval of the received signal is removed by GI elimination section 320 and the signal is subjected to a fast Fourier transform by FFT section 330 and P/S-converted by P/S conversion section 340 into serial data.

Then, as in the case of Embodiment 1, control data is output by control CH reception section 350, user data is output by user CH reception section 360 and the error detection result is output to FB information transmission section 410.

Furthermore, PL signal reception section 370 outputs the reception quality measurement result of pilot signals to FB information transmission section and FBSC selection section 900. In this embodiment, pilot signals are included in all subcarriers and PL signal reception section 370 outputs the reception quality of a pilot signal for subcarriers to FBSC selection section 900.

Next, the operation after feedback information is transmitted from the mobile station apparatus until it is received by the base station apparatus will be explained.

When the reception quality for subcarriers is output to FBSC selection section 900, the subcarrier having the highest reception quality is selected as a feedback information subcarrier. The selected feedback information subcarrier is reported to SC assignment section 430a.

On the other hand, as in the case of Embodiment 1, feedback information such as CQI and ACK/NACK is generated by FB information transmission section 410 and multiplexed with other transmission data (not shown) by multiplexing section 420.

The multiplexed data including feedback information is assigned a subcarrier by SC assignment section 430a. Here, the subcarrier assigned to the feedback information by SC assignment section 430a is the feedback information subcarrier selected by FBSC selection section 900. In other words, the subcarrier assigned to the feedback information is the subcarrier in an optimum propagation state.

As in the case of Embodiment 1, the multiplexed data including feedback information is S/P-converted by S/P conversion section 440 and the same number of pieces of parallel data as subcarriers are output to spreading section 910. The output pieces of parallel data are spread using their respective spreading codes. At this time, the data of the feedback information subcarrier is spread using a predetermined spreading code for the feedback information.

The spread pieces of parallel data are subjected to an inverse fast Fourier transform by IFFT section 450 and thereby transformed into OFDM data, and the OFDM data is inserted a guard interval by GI insertion section 460, subjected to predetermined radio transmission processing by radio transmission section 470 and transmitted to the base station apparatus via the antenna.

The signal transmitted from the mobile station apparatus is received by radio reception section 210 via the antenna of the base station apparatus and subjected to predetermined radio reception processing. The guard interval of the received signal is removed by GI elimination section 220 and the signal is then subjected to a fast Fourier transform by FFT section 230 and data of subcarriers are output.

The data of subcarriers are despread by despreading section 800 using the same spreading code as that used for spreading. Furthermore, data of all the subcarriers are despread using spreading codes for feedback information and the despreading result is output to SC decision section 810.

SC decision section 810 decides that the subcarrier with the highest correlation value which is the result of despreading using the spreading code for feedback information is the feedback information subcarrier.

Since the feedback information subcarrier has been selected by the mobile station apparatus, additional information about which subcarrier has been selected as the feedback information subcarrier should originally be transmitted to the base station apparatus. However, in this embodiment, the mobile station apparatus spreads the feedback information subcarrier using a predetermined spreading code for feedback information, and therefore the base station apparatus is capable of detecting the subcarrier having the highest correlation value using this spreading code for feedback information as the feedback information subcarrier.

Hereafter, the feedback information subcarrier is output to FB information reception section 250 as in the case of Embodiment 1 and subjected to adaptive modulation and retransmission control based on the feedback information.

Thus, according to this embodiment, the mobile station apparatus selects the downlink subcarrier having the highest reception quality as the uplink feedback information subcarrier, and therefore the base station apparatus need not transmit information about the feedback information subcarrier, and it is possible to thereby prevent the downlink capacity from reducing. And since the mobile station apparatus spreads the feedback information using a predetermined spreading code for feedback information and maps the spread feedback information about the feedback information subcarrier, the base station apparatus can detect the feedback information subcarrier through the despreading processing using the spreading code for feedback information even when there is no additional information.

Embodiment 3 may also be applied to Embodiment 1. In this case, even when the downlink FBSC information is received by error and the mobile station apparatus transmits the feedback information using a subcarrier which is different from that of the FBSC information, the base station apparatus detects the subcarrier on which the feedback information is actually mapped through despreading using the spreading code for feedback information, and therefore the base station apparatus can receive the feedback information correctly. When the feedback information is received correctly, it is possible to prevent the amount of retransmission from increasing and improve the system capacity and throughput.

Furthermore, the above described embodiments explains the case where a mobile station apparatus transmits feedback information to a base station apparatus, but the present invention can also be applied to the case where a base station apparatus transmits feedback information to a mobile station apparatus.

A first aspect of the multicarrier communication apparatus according to the present invention adopts a configuration including a reception section that receives a multicarrier signal with data mapped on a plurality of carriers, a measuring section that measures reception quality of the plurality of carriers and a determining section that determines a carrier having the best measured reception quality as a feedback information carrier.

According to this configuration, a carrier having the best reception quality is designated out of the plurality of carriers of the multicarrier signal as the feedback information carrier, and therefore it is not necessary to increase transmit power when transmitting feedback information generally having high required quality and possible to suppress interference of the feedback information with other channels and alleviate a reduction in the channel capacity.

A second aspect of the multicarrier communication apparatus of the present invention adopts a configuration in which, when there are a plurality of communicating stations, the determining section preferentially assigns the carrier having the best reception quality to a communicating station having the large amount of data to be transmitted from the subject apparatus and designates as the carrier a feedback information carrier for the communicating station.

According to this configuration, feedback information carriers having high reception quality are preferentially assigned to communicating stations having the large amount of data to be transmitted from the subject apparatus, and therefore it is possible to suppress interference of feedback information from communicating stations having the large amount of received data and large amount of feedback information with other channels and improve the channel capacity of the overall radio communication system. Furthermore, errors are less likely to occur in feedback information of communicating stations having the large amount of data and large amount of retransmission, and therefore it is possible to minimize packet errors due to errors in feedback information and a reduction in throughput of the channels from the subject apparatus to the communicating stations due to retransmissions.

A third aspect of the multicarrier communication apparatus of the present invention adopts a configuration in which the determining section determines the feedback information carrier based on a multicarrier signal received immediately before transmitting the feedback information.

According to this configuration, a feedback information carrier is determined based on a multicarrier signal received immediately before transmitting the feedback information, and therefore it is possible to determine the feedback information carrier according to the latest propagation situation even when the propagation situation changes rapidly and further suppress interference of the feedback information with other channels.

A fourth aspect of the multicarrier communication apparatus of the present invention adopts a configuration, further including a transmission section that transmits information about feedback information carrier in which the reception section receives a multicarrier signal with feedback information mapped on the feedback information carrier.

According to this configuration, information about the feedback information carrier is transmitted, that is, the receiving side of the feedback information determines the feedback information carrier, and therefore it is possible to determine a feedback information carrier having high quality even based on an FDD (Frequency Division Duplex) scheme in which multicarrier signals having different carrier configurations are transmitted on the uplink and downlink.

A fifth aspect of the multicarrier communication apparatus of the present invention adopts a configuration, further including a calculation section that calculates required transmit power so that the reception quality of the feedback information carrier becomes the required quality, in which the transmission section transmits the calculated required transmit power and information about the feedback information carrier.

According to this configuration, information about the required transmit power whose required quality is the reception quality of the feedback information carrier is transmitted, and therefore the communicating stations is capable of setting the transmit power of feedback information properly and further suppressing interference of the feedback information with other channels.

A sixth aspect of the multicarrier communication apparatus of the present invention adopts a configuration in which the calculation section calculates the required transmit power based on a difference between the reception quality of the feedback information carrier and the required quality.

According to this configuration, the required transmit power is calculated based on a difference between the reception quality of the actual feedback information carrier and the required quality, and therefore it is possible to easily calculate accurate required transmit power.

A seventh aspect of the multicarrier communication apparatus of the present invention adopts a configuration further including a transmission section that transmits feedback information using the feedback information carrier.

According to this configuration, feedback information is transmitted using the feedback information carrier, and therefore it is not necessary to report information about the feedback information carrier based on a TDD (Time Division Duplex) scheme in which a multicarrier signal in the same carrier configuration is transmitted on the uplink and downlink to a communicating station and alleviate a reduction in the channel capacity.

An eighth aspect of the multicarrier communication apparatus of the present invention adopts a configuration further including a spreading section that spreads the feedback information carrier using a predetermined spreading code for feedback information.

According to this configuration, the feedback information carrier is spread using a spreading code for feedback information, and therefore the receiving side of the feedback information despreads the multicarrier signal using the spreading code for feedback information, and can thereby easily detect the feedback information carrier.

A base station apparatus of the present invention adopts a configuration including the multicarrier communication apparatus according to any one of the above described aspects.

According to this configuration, the base station apparatus can realize operations and effects similar to those of the multicarrier communication apparatus according to any one of the above described aspects.

A mobile station apparatus of the present invention adopts a configuration including the multicarrier communication apparatus according to any one of the above described aspects.

According to this configuration, the mobile station apparatus can realize operations and effects similar to those of the multicarrier communication apparatus according to any one of the above described aspects.

A feedback information communication method according to the present invention includes a step of receiving a multicarrier signal with data mapped on a plurality of carriers, a step of measuring reception quality of the plurality of carriers and a step of determining a carrier having the best measured reception quality as a feedback information carrier.

According to this method, a carrier having the best measured reception quality of carriers of the multicarrier signal is designated as the feedback information carrier, and therefore it is not necessary for increasing transmit power when transmitting feedback information generally having high required quality, and it is possible to suppress interference of the feedback information with other channels and alleviate a reduction in the channel capacity.

The present application is based on Japanese Patent Application No. 2003-191293 filed on Jul. 3, 2003, entire content of which is expressly incorporated herein by reference.

INDUSTRIAL APPLICABILITY

The present invention is suitable for use in a communication apparatus based on a multicarrier communication scheme.

The invention claimed is:

1. A base station comprising:
    an allocation unit configured to allocate an uplink resource, comprising a frequency resource and a spreading code resource, to be used by a mobile station for transmitting an ACK/NACK signal in response to user data transmitted from the base station to the mobile station;
    a generating unit configured to generate transmission power information of the ACK/NACK signal;
    an encoding unit configured to jointly encode first allocation information together with the transmission power information and second allocation information to provide control information including the encoded first allocation information, the encoded transmission power information and the encoded second allocation information that are directed to the mobile station, wherein the first allocation information indicates the uplink resource and the second allocation information comprises downlink resource allocation information and indicates a destination of the user data;
    a modulating unit configured to modulate the control information; and
    a transmitting unit configured to transmit, to the mobile station, the modulated control information including the encoded first allocation information, the encoded transmission power information and the encoded second allocation information to be simultaneously transmitted on a control channel and configured to transmit, to the mobile station, the user data on a user channel.

2. The base station according to claim 1, wherein the frequency resource corresponds to a subcarrier.

3. The base station according to claim 1, further comprising:
    a measuring unit configured to measure a channel quality between the base station and the mobile station, wherein:
    said allocating unit allocates the uplink resource based on the channel quality.

4. A transmitting method comprising:
    allocating an uplink resource, comprising a frequency resource and a spreading code resource, to be used by a mobile station for transmitting an ACK/NACK signal in response to user data transmitted from a base station to the mobile station;
    generating transmission power information of the ACK/NACK signal;
    encoding jointly first allocation information together with the transmission power information and second allocation information to provide control information including the encoded first allocation information, the encoded transmission power information and the encoded second allocation information that are directed to the mobile station, wherein the first allocation information indicates the uplink resource and the second allocation information comprises downlink resource allocation information and indicates a destination of the user data;
    modulating the control information;
    transmitting, to the mobile station, the modulated control information including the encoded first allocation information, the encoded transmission power information and the encoded second allocation information to be simultaneously transmitted on a control channel; and
    transmitting, to the mobile station, the user data on a user channel.

5. The transmitting method according to claim 4, wherein the frequency resource corresponds to a subcarrier.

6. The transmitting method according to claim 4, further comprising:
    measuring a channel quality between the base station and the mobile station, wherein the uplink resource is allocated based on the channel quality.

* * * * *

UNITED STATES PATENT AND TRADEMARK OFFICE
CERTIFICATE OF CORRECTION

PATENT NO. : 8,032,144 B2  
APPLICATION NO. : 10/562935  
DATED : October 4, 2011  
INVENTOR(S) : Akihiko Nishio Page 1 of 1

It is certified that error appears in the above-identified patent and that said Letters Patent is hereby corrected as shown below:

Title page, Item (54) Title and Column 1  
Title incorrectly reads:

"MULTI-CARRIER COMMUNICATION DEVICE AND FEEDBACK INFORMATION COMMUNICATION METHOD"

and should read:

"MULTICARRIER COMMUNICATION APPARATUS AND FEEDBACK INFORMATION COMMUNICATION METHOD"

Signed and Sealed this  
Eighth Day of January, 2013

David J. Kappos  
*Director of the United States Patent and Trademark Office*